Aug. 25, 1942.   J. P. UMHOEFER ET AL   2,294,009
LEVERED WIND DRIVEN POWER UNIT
Filed April 27, 1939   2 Sheets-Sheet 1
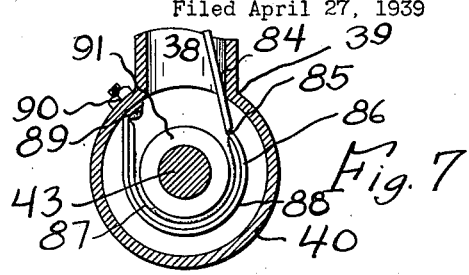
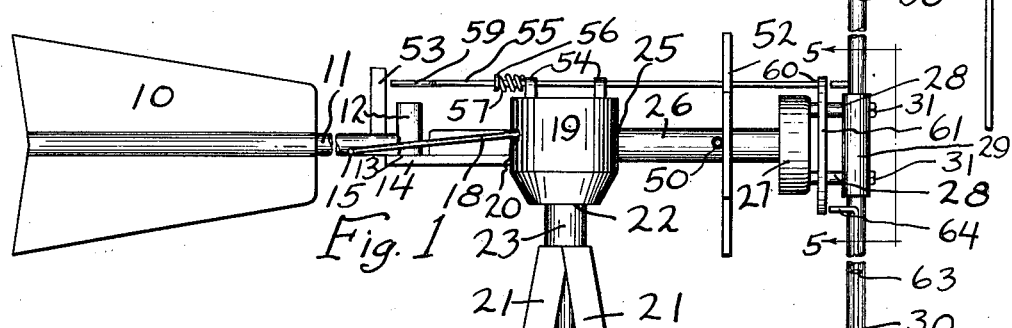
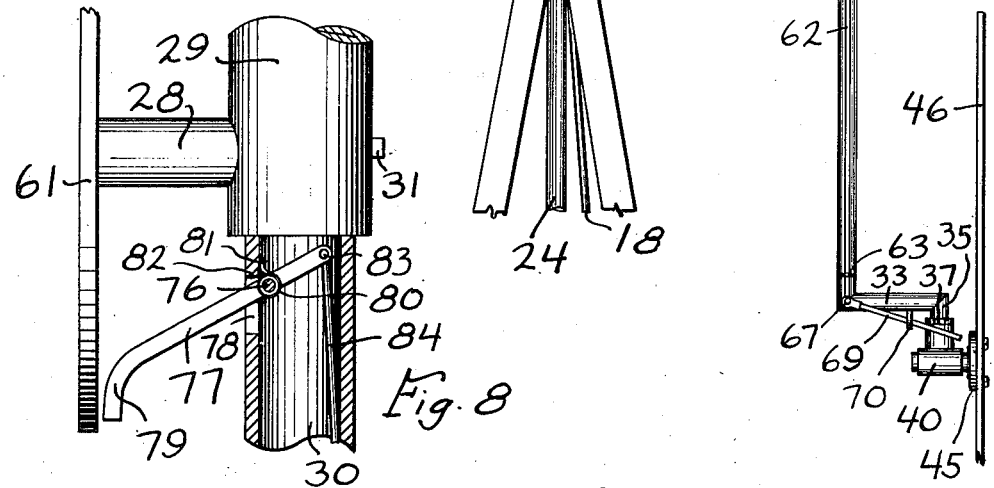
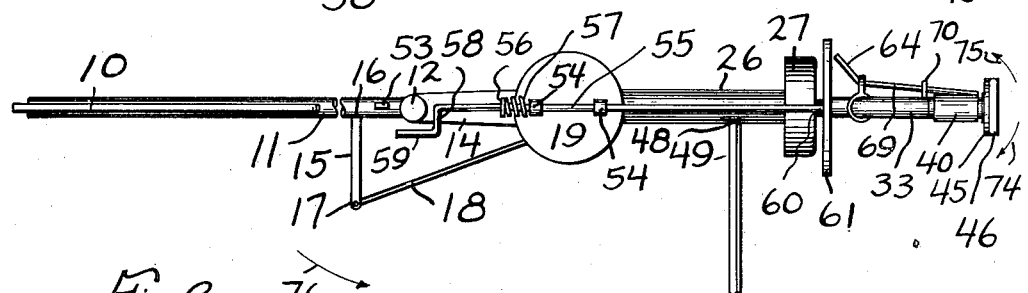
INVENTORS
John P. Umhoefer
Edward P. Eischen
BY
ATTORNEY Aug. 25, 1942.   J. P. UMHOEFER ET AL   2,294,009
LEVERED WIND DRIVEN POWER UNIT
Filed April 27, 1939   2 Sheets-Sheet 2
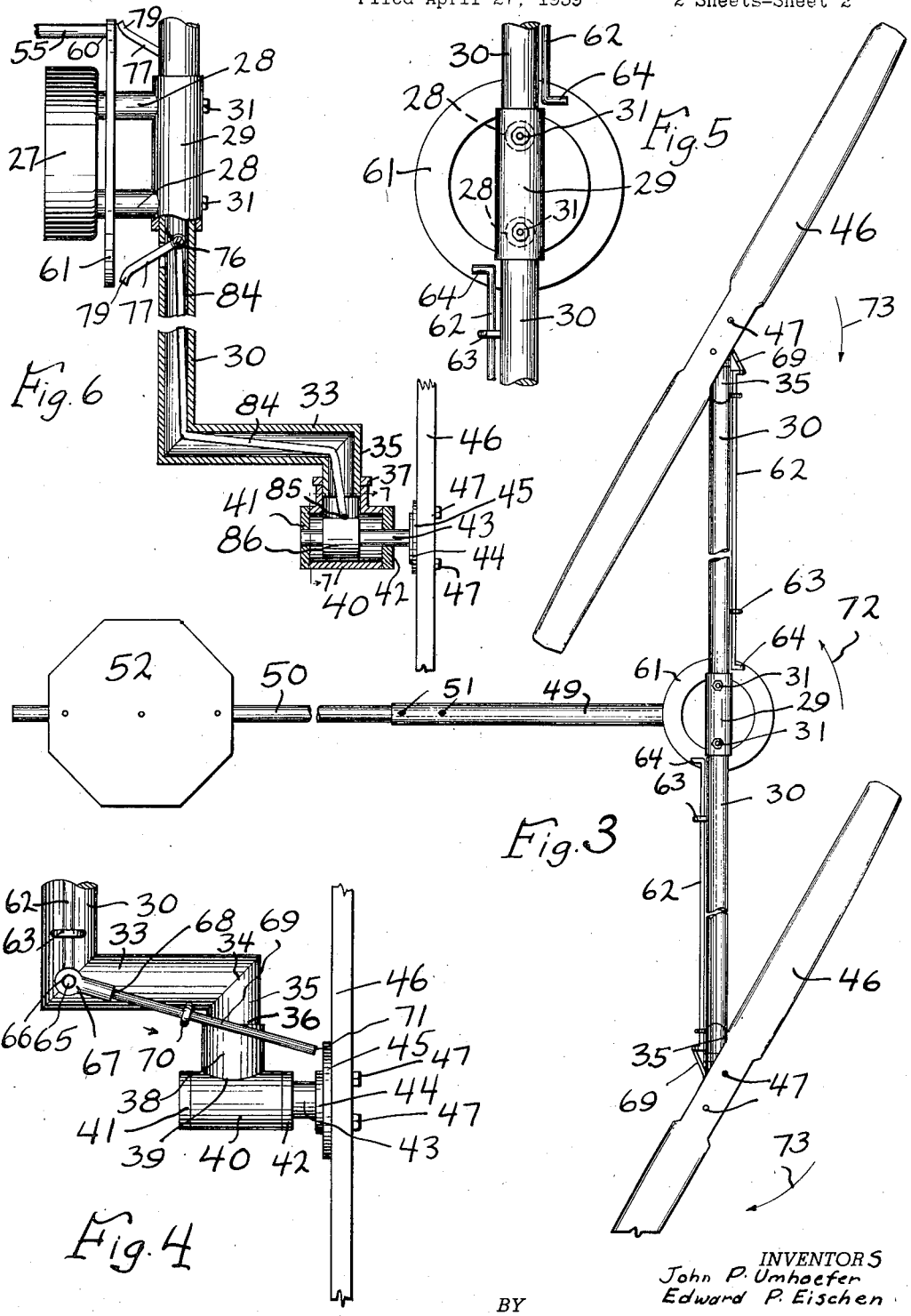
INVENTORS
John P. Umhoefer
Edward P. Eischen
BY Sam J. Slotsky
ATTORNEY Patented Aug. 25, 1942

2,294,009

UNITED STATES PATENT OFFICE 2,294,009

LEVERED WIND DRIVEN POWER UNIT

John P. Umhoefer, Cleghorn, and Edward P. Eischen, Cherokee, Iowa

Application April 27, 1939, Serial No. 270,350

4 Claims. (Cl. 170—38)

Our invention relates to a wind driven unit.

An object of our invention is to provide a wind driven unit which through the use and arrangement of certain members provides a device which will generate a great amount of torque, and by the generation of such torque will eliminate the necessity for gears and other arrangements for increasing the power to pump arm units and other units requiring maximum torques.

A further object of our invention is to provide such an arrangement which causes a back thrust to be imparted to a revolving arm for the above mentioned purposes.

A further object of our invention is to provide means for reversing the motion of the arm if such is necessary.

A further object of our invention is to provide a braking arrangement for braking the individual rotating units when the arrangement is carried at right angles to the wind.

A further object of our invention is to provide a rotating structure which will generate such power for electrical generating purposes without the necessity of imparting high speeds which set up objectionable vibration, etc.

A further object of my invention is to provide an adjustable structure for certain purposes and to provide such a structure in a simple arrangement.

With these and other objects in view, our invention consists in the construction, arrangement and combination of the various parts of our device, whereby the objects contemplated are attained, as hereinafter more fully set forth, pointed out in our claims, and illustrated in the accompanying drawings, in which:

Figure 1 is a side elevation of the unit as mounted on a tower,

Figure 2 is an upper plan view of the same,

Figure 3 is a forward elevation,

Figure 4 is a detail,

Figure 5 is a further detail taken substantially along the lines 5—5 of Figure 1, Figure 6 is a modification of the braking arrangement, Figure 7 is a section taken along the lines 7—7 of Figure 6, and Figure 8 is a further detail.

We have employed the character 10 to designate the tail vane of the structure which is attached to a pipe 11 which pipe is attached to a coil spring housing 12 which is pivoted at 13 to the bracket 14. The member 12 contains a coil spring which is adapted to maintain the tail vane 10 in extended position as shown in Figure 1 during normal operating conditions. A lever 15 is attached at 16 to the pipe member 11 and to the outer extremity of the lever 15 is attached at 17 the control wire 18 which passes within the casing 19 at 20 and thence passes downwardly between the legs of the tower 21. The casing 19 is suitably pivoted at 22 upon a member 23.

The casing 19 can contain any suitable power transmitting device preferably of the cam shaft direct connected type which is connected to an arm 24 which passes downwardly to the pump or other unit to be driven. Connected to the casing 19 at 25 is a further hollow member 26 which receives a shaft which extends forwardly and is attached to the drum member 27. The drum member 27 is further connected to a pair of short pipe members 28 which in turn are attached to a further transverse pipe member 29. Received within the pipe member 29 is the substantially elongated pipe member 30 which is secured in the member 29 by means of the lock screws 31.

Attached at 32 to the pipe 30 are the forwardly extending pipe members 33 which are attached at 34 to further transverse pipe members 35. The pipe members 35 are threaded at 36 (see Figure 4) upon which threads are engaged the lock nuts 37. Threadably engaged with the threads 36 is a further hollow pipe member 38 which is attached at 39 to a further transverse boxing member 40. The member 40 includes a pair of bearings 41 and 42 into which are journalled the shafts 43 which shafts are attached to a member 44 which is attached to a disc 45. A pair of individual propellers 46 are attached at 47 to the members 44 and 45. Attached at 48 to the shaft housing 26 is the laterally extending pipe member 49 which receives a further pipe 50 which is secured by means of the set screws 51. Suitably attached to the pipe 50 is the governing vane member 52.

The vane 52 is adapted to govern the speed of the propellers since a stronger wind against this vane will cause a slight deviation of this structure from normal wind forces. Attached to the member 11 is the upright member 53, and attached at the top of the casing 19 are a pair of members 54 which receive the elongated push rod 55 to which is attached a washer 56 and between the washer 56 and the rear member 54 is placed a compression spring 57. The member 55 extends into the transverse extension 58 which terminates into the rearwardly extending portion 59 which is slightly rearwardly of the pivoting point 12 of the tail vane structure. The rod 55 extends forwardly above the member 27 and is attached at 60 to the ring 61. The ring 61 is arranged to clear the pipe members 28 and is thus freely suspended by means of the rod 55.

A pair of rods 62 are retained against the pipe member 30 by means of suitable eye-bolts 63 which rods 62 extending into the inwardly extending portions 64 which are normally positioned a slight distance from the ring 61. The rods 62 are bent outwardly at 65 (see Figure 3) and these outwardly bent ends are engaged at 66 with suitable openings in the members 67. The members 67 are threadably engaged at 68 with further rods 69 which pass angularly outwardly with respect to the members 33 and which are received within further eye-bolts 70. The rods 69 terminate at 71 a slight distance from the discs 45.

Now that the details of structure of our invention have been explained, we shall explain the operation thereof.

The propellers 46 in order to provide the proper operation of the device are positioned so that they rotate in a plane which is not parallel to the plane of rotation of the arms 30, which is effected by pivoting the member 28 at 36 and locking in fixed position. The propellers 46 which are pitched as is known in the art, will then operate in combination with the arms 30 in the following manner.

Since the shafts 43 are parallel to the wind, then an equal and opposite reaction will be given to each blade of the propeller due to the action of the wind thereon. Due to the equal and opposite reaction, an equal and opposite back thrust will be formed. Since the back thrust forces are at unequal distances from the shaft 26, a moment will be formed causing arms 30 to rotate. When the propeller 46 is rotated about the pivot at 35, the pitch of one blade of each propeller will be increased and the pitch of the other blade will be decreased relative to the direction of the wind, causing unequal reactions and unequal back thrusts, said unequal back thrusts being sufficient to cause the arm 30 to rotate.

By virtue of this arrangement, by turning the propeller in the opposite way around the member 35, the effect will be provided to cause the arms 30 to rotate in the opposite direction. In this manner a great amount of power is transmitted to the driving shaft which allows a direct connection of the arm 24 to suitable cam movements within the casing 19.

This, then, eliminates the necessity of extra gears since a great deal of power is directly created. As shown in Figure 3, the unit can be revolving in the direction of the arrow 72 and the blades are always usually revolving clockwise in the direction of the arrow 73. However, it is possible that the blades 46 can rotate in the same direction as the arms 30 depending upon the positioning of the blades with respect to the arm.

For instance, if the blade carrying units are swung in the direction of the arrow 74 as shown in Figure 2 the direction of rotation of the entire assembly will be in one direction whereas if the blades are swung in the direction of the arrow 75, the rotation will be in the other direction.

In other words, since the blades 46 are usually rotating in one direction, in order to change direction of rotation of the arms 30, the blades can be pivoted as mentioned, thereby reversing the direction of the arms 30 although the blades themselves may rotate in the same direction which rotation of course is fixed due to the airfoil on the blades themselves.

The tilting of the blades by swinging their shafts as described produces a different direction of rotation of the arms due to wind striking at different angles. It is necessary when taking the unit out of the wind to provide a proper braking structure and to this end we provide the brake as shown which comprises the functioning of the following member.

When braking the device, the control cable 18 is pulled against the torsion in the spring in the unit 12 which swings the tail 10 in the direction of the arrow 76a which of course then swings the propeller units out of the wind and at right angles thereto. The swinging of the vane 10 and the pipe 11 carries the member 53 in the same direction which member strikes against the portion 59 of the rod 55. Since the rod is square, there will be no twisting motion of the same and since the rod 55 is attached to the ring 61 at 60, the ring 61 will be carried forwardly striking against the end of the levers 64.

The levers 64 which are connected to the rod 62, will rotate these rods which rotation will cause the levered end 65 to carry the rod 69 outwardly toward the discs 45 which are attached to the propellers 46. The point 71 of the rod 69 will then contact against these discs with sufficient friction to hold the propellers 46 against rotation and only a slight force is necessary for this purpose. Any slight angular variation of the propeller is made by adjustment of the threaded end 69 within the threaded portion 68 of the member 67.

It will be noted from Figure 3 that the rods 62 and the units attached to the same are out of the wind during rotation of the arms 30. If desired, the rods 62 can be placed on the other side of the arms 30 by merely changing the position of the eyebolts 63 to the other side in tapped holes already provided. After release of the tail vane to normal position, the spring 57 will carry the brake out of operation. The rod end 71 is nearly on the vertical center line of the disc 45.

A modified form of brake structure is shown in Figures 6, 7, and 8. In this type, the same structure is used up to the disc 61. This alternative form of brake, however, contemplates the use of a braking arrangement in which all of the functioning members are located within the pipe frame work of the device. Pivoted through the pipe by means of a suitable pin 76 is the lever 77 which extends through the lengthened slot 78. The lever 77 includes arcuate ends 79 and attached about the pin 76 is a torsion spring 80 which engages at 81 against the pipe and can be secured thereto. The slot 78 terminates at 82 to limit outward or upward movement of the lever 77 and attached at 83 to the lever and interiorly of the pipe 30 is the cable 84. The cable 84 extends downwardly through the pipe 30 and is bent around the contracting corners which are rounded and then passes through the lateral pipe 33 and thence into the further pipe portion 35 and is attached at 85 to the free extremity of the brake member 86.

The member 86 comprises the brake lining 87 to which is attached the arcuate spring member 88. The member 88 has sufficient resiliency to maintain tension in the cable 84 and against the lever 77. The other end of the member 86 passes upwardly and is suitably attached to a screw 89 which is attached by means of the nut 90 to the housing 40 of the propeller shaft. The shaft 43 includes an expanded portion at 91 which is of larger diameter than the shaft to insure sufficient surface for the braking effect.

It will be understood that there are two arrangements as described one for each propeller and as shown in Figure 6 where the further upper lever is indicated for the upper propeller. It will now be seen that when the braking action is applied or when the disc 61 is thrust toward the propeller arrangement, it will contact against the curved portion 79 of the levers 77. This action will cause the levers 77 to be pivoted with the point of attachment at 83 being forced toward the shaft of the arrangement and thereby pulling on the cables 84.

This, in turn, draws the brake lining 87 against the member 91 thereby causing a braking effect and causing the propellers to cease their rotation. Conversely, when the tail vane is released, the disc will spring back to normal position and the tension in the member 88 will cause the brake to spring back to normal position as shown in Figure 7.

The braking action is then imparted without the use of outside members and the levers etc. can rotate freely since they are separate from the disc 61. It will be understood that the tendency of rotation of the propellers is very slight when out of the wind and only a slight braking effect is necessary, such braking being applied to prevent jerking effects of wind currents, etc.

It will now be seen that we have provided a wind driven unit which will generate a great amount of torque and will thus eliminate the necessity for extra gears and the like in powering units, that we have provided an arrangement of this type which can be reversed if such is desired, which includes means for braking the units, which provides a unit which will function with sufficient torque at reduced speeds for the necessary purposes, which is readily adjustable for different conditions and which can be manufactured at a reasonable cost.

Some changes may be made in the construction and arrangement of the parts of our invention without departing from the real spirit and purpose of our invention, and it is our intention to cover by our claims any modified forms of structure or use of mechanical equivalents, which may be reasonably included within their scope.

We claim as our invention:

1. A wind driven power unit comprising a driving shaft, a substantially lengthened arm attached at the midpoint thereof to said shaft, propellers rotatably attached at the ends of said arm, means for pivoting said propellers to provide rotation of the propellers in a plane which is not parallel to the plane of rotation of said arm, means for braking said propellers including a push rod attached adjacently to the shaft thereof, a tail vane attached to said power unit, means for pivoting said tail vane, means incidental with pivotal action of said tail vane to force said push rod inwardly, means attached to said push rod to stop rotation of said propeller, including a ring member attached to the push rod, control rods attached to said arm having a levered extension operated by said ring, further forwardly extending rods attached at the end of said control rods, said forwardly extending rods adapted to contact against portions of the propellers upon movement of said ring for stopping the rotation thereof.

2. A wind driven power unit comprising a driving shaft, a substantially lengthened arm attached at the midpoint thereof to said shaft, propellers rotatably attached at the ends of said arm, means for pivoting said propellers to provide rotation of the propellers in a plane which is not parallel to the plane of rotation of said arm, means for braking said propellers including a push rod attached adjacently to the shaft thereof, a tail vane attached to said power unit, means for pivoting said tail vane, means incidental with pivotal action of said tail vane to force said push rod inwardly, means attached to said push rod to stop rotation of said propeller, including a ring member attached to the push rod, control rods attached to said arm having a levered extension operated by said ring, further forwardly extending rods attached at the end of said control rods, said forwardly extending rods adapted to contact against portions of the propellers upon movement of said ring for stopping the rotation thereof, means for adjusting the length of said forwardly extending rods.

3. A wind driven power unit comprising a driving shaft, a centrally positioned power unit attached to said driving shaft, lengthened arms extending radially from said driving shaft, high-speed propellers rotatably attached at the ends of said arms, means for pivoting said propellers to provide rotation of the propellers in a plane which is not parallel to the plane of rotation of said arms, pivotal movement of said propellers to one or the other side of said lengthened arms providing coresponding reversed direction thereof.

4. A wind driven power unit comprising a driving shaft, a centrally positioned power unit attached to said driving shaft, lengthened arms extending radially from said driving shaft, high-speed propellers rotatably attached at the ends of said arms, means for pivoting said propellers to provide rotation of the propellers in a plane which is not parallel to the plane of rotation of said arms, pivotal movement of said propellers to one or the other side of said lengthened arms providing corresponding reversed direction thereof, means for braking said propellers, a tail vane attached to the power unit, means cooperant upon movement of said tail vane to provide wind braking means.

JOHN P. UMHOEFER.
EDWARD P. EISCHEN.